(12) United States Patent
Yang et al.

(10) Patent No.: US 11,659,606 B2
(45) Date of Patent: May 23, 2023

(54) DATA TRANSMISSION CHANNEL ADDRESS ALLOCATION METHOD, ASSOCIATION METHOD, APPARATUS, AND STORAGE MEDIUM

(71) Applicant: ZTE CORPORATION, Shenzhen (CN)

(72) Inventors: Li Yang, Shenzhen (CN); Zijiang Ma, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 36 days.

(21) Appl. No.: 16/982,643

(22) PCT Filed: Mar. 15, 2019

(86) PCT No.: PCT/CN2019/078354
§ 371 (c)(1),
(2) Date: Sep. 21, 2020

(87) PCT Pub. No.: WO2019/179370
PCT Pub. Date: Sep. 26, 2019

(65) Prior Publication Data
US 2021/0029754 A1    Jan. 28, 2021

(30) Foreign Application Priority Data

Mar. 21, 2018 (CN) .......................... 201810235849.5

(51) Int. Cl.
*H04W 76/11* (2018.01)
*H04W 76/15* (2018.01)
(Continued)

(52) U.S. Cl.
CPC .............. *H04W 76/11* (2018.02); *H04W 8/26* (2013.01); *H04W 36/06* (2013.01); *H04W 76/15* (2018.02); *H04W 80/02* (2013.01)

(58) Field of Classification Search
CPC ......... H04W 4/08; H04W 8/26; H04W 36/06; H04W 76/10; H04W 76/11; H04W 76/15; H04W 76/22
(Continued)

(56) References Cited

U.S. PATENT DOCUMENTS

| 2011/0075675 A1 | 3/2011 | Koodli et al. |
| 2017/0230309 A1 | 8/2017 | Bennett et al. |

(Continued)

FOREIGN PATENT DOCUMENTS

| CN | 101808361 A | 8/2010 |
| CN | 102223691 A | 10/2011 |

(Continued)

OTHER PUBLICATIONS

International Search Report Form PCT/ISA/210, and Written Opinion Form PCT/ISA/237, International Application No. PCT/CN2019/078354 pp. 1-5 International Filing Date Mar. 15, 2019, dated Jun. 6, 2019.

(Continued)

*Primary Examiner* — Harun Chowdhury
(74) *Attorney, Agent, or Firm* — George McGuire

(57) ABSTRACT

Disclosed are a data transmission channel address allocation method, association method, apparatus, and a storage medium. The method includes: first interface signaling is sent to a first base station, where the first interface signaling at least includes a number N of uplink data transmission channel addresses which are pre-allocated, where N is an integer greater than or equal to 2.

9 Claims, 7 Drawing Sheets

(51) Int. Cl.
*H04W 8/26* (2009.01)
*H04W 36/06* (2009.01)
*H04W 80/02* (2009.01)

(58) Field of Classification Search
USPC .............................. 370/252, 328, 329, 331
See application file for complete search history.

(56) References Cited

U.S. PATENT DOCUMENTS

| | | | | |
|---|---|---|---|---|
| 2019/0191467 | A1* | 6/2019 | Dao | H04W 76/10 |
| 2020/0382240 | A1* | 12/2020 | Centonza | H04W 76/11 |
| 2020/0404732 | A1* | 12/2020 | Shi | H04W 76/22 |

FOREIGN PATENT DOCUMENTS

| | | |
|---|---|---|
| CN | 102857905 A | 1/2013 |
| CN | 103327642 A | 9/2013 |
| CN | 103458398 A | 12/2013 |
| CN | 103888959 A | 6/2014 |
| CN | 104519523 A | 4/2015 |
| CN | 104812008 A | 7/2015 |
| CN | 105682140 A | 6/2016 |
| CN | 105992272 A | 10/2016 |
| CN | 107580342 A | 1/2018 |
| EP | 2936883 A1 | 10/2015 |
| EP | 2936883 B1 | 2/2017 |
| EP | 3282760 A1 | 2/2018 |
| WO | 2019064256 A1 | 4/2019 |

OTHER PUBLICATIONS

Translated CN OA, pp. 1-13.
3GPP TS 36.300 V14.5.0 (Dec. 2017) rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GGPP TS 37.340 V15.0.0 (Dec. 2017) 3rd Generation Partnership Project; Technical Specification Group Radio Access Network; Evolved Universal Terrestrial Radio Access (E-UTRA) and NR; Multi-connectivity; Stage 2 (Release 15).
European Search Report, pp. 1-10, dated Nov. 12, 2021.
Supplemental Search Report, p. 1 of 1.
"PDU Session split at UPF", Ericsson, #GPPTSG-RAN WG3, publication date Feb. 17, 2018.
Translated Chinese Office Action, 2 pages.
Translated Chinese Search Report.

\* cited by examiner

DATA TRANSMISSION CHANNEL ADDRESS ALLOCATION METHOD, ASSOCIATION METHOD, APPARATUS, AND STORAGE MEDIUM

CROSS-REFERENCE TO RELATED APPLICATIONS

This is a National Stage Application, filed under 35 U.S.C. 371, of International Patent Application No. PCT/CN2019/078354, filed on Mar. 15, 2019, which claims priority to Chinese patent application No. 201810235849.5 filed on Mar. 21, 2018, contents of both of which are incorporated herein by reference in their entireties.

TECHNICAL FIELD

The present disclosure relates to the technical field of mobile communications, and in particular to a data transmission channel address allocation method, an association method, an apparatus, and a storage medium.

BACKGROUND

The 5th generation (5G) system includes a next generation core network (5GC) and a next generation radio access network (NG-RAN) base station. The 5GC includes basic network element nodes such as an access mobility function (AMF), a session management function (SMF) and a user plane function (UPF). The NG-RAN at least includes two different types of base stations, namely, a next generation evolved node B (NG-eNB) evolved based on a 4th generation (4G) evolved Node B (eNB) and a gNB which is newly designed to support a new radio (NR) standard air interface. The NG-RAN base station is connected to the 5GC through a NG interface, and the NG-RAN base stations are connected to each other through an Xn interface.

In an NG-RAN system, single connectivity (SC) and dual/multi connectivity (DC/MC) operating functions are supported. In an SC mode, a user equipment (UE) only has one data transmission channel at an air interface and a network side; while in a DC/MC mode, the UE has two or more data transmission channels at the air interface or the network side. Taking the DC mode as an example, the architecture according to the DC mode is described below in connection with FIG. 1.

Under dual connectivity, the UE may simultaneously establish and maintain two independent radio link connections (i.e., air interface data transmission channels) with two NG-RAN base stations through a Uu-Control plane (Uu-C) connection and a Uu-User plane (Uu-U) connection at the air interface, where one NG-RAN base station is referred to as a master node (MN), and the other base station is referred to as a secondary node (SN). The MN and the SN may simultaneously establish and maintain two independent network side user plane connections with a UPF of a core network user plane network element node through the NG interface, where a next generation-user plane (NG-U) is a network user data transmission channel. In the drawings, next generation-control plane (NG-C) connections between network element nodes are represented by dashed lines, and next generation-user plane (NG-U) connections, i.e., user data transmission channels, between network element nodes are represented by solid lines.

The user data transmission channel is divided into an MN side and an SN side. The NG-U (MN) provides a data transmission channel, i.e., a general packet radio service tunnel (GTP Tunnel), between the UPF and the MN and for transmitting the uplink and downlink data packets carried on multiple user data quality of service flows contained in a specific protocol data unit session (PDU Session), Protocol Data Unit Service (QoS) bearer flow. According to a currently used protocol, the establishment of this channel requires the UPF to provide "an uplink data transmission channel address at the MN side" and requires the MN to provide "a downlink data transmission channel address at the MN side", including a transport layer address and a general packet radio service tunnel address identification (GTP TEID). The interaction of information of two transmission channel addresses described above which are uplink and downlink paired is performed through a NG-C control plane signaling process. Similarly, the establishment of the channel at the SN side requires the UPF to provide "an uplink data transmission channel address at the SN side" and requires the SN to provide "a downlink data transmission channel address at the SN side", but the difference is that since the SN cannot be directly connected to the AMF/SMF, so that the interaction of information of the two transmission channel addresses at the SN side is performed through NG-C control plane signaling and Xn-C control plane signaling.

The present disclosure provides a data transmission channel address allocation method, association method, apparatus, and a storage medium end transmission delay of an uplink data packet may occur easily at a rear end of an uplink data transmission channel address port of a single UPF unit, or an uplink data transmission channel needs to be re-established with other new UPF uplink addresses when a fault occurs, so that the service interruption is caused, the use effect of a user is affected.

SUMMARY

The present disclosure provides a data transmission channel address allocation method, association method, apparatus, and a storage medium.

In a first aspect, the present disclosure provides a data transmission channel address allocation method. The method includes: first interface signaling is sent to a first base station, where the first interface signaling at least includes a number N of uplink data transmission channel addresses which are pre-allocated, where N is an integer greater than or equal to 2.

In a second aspect, the present disclosure further provides a data transmission channel association method. The method includes: first interface signaling sent by a core network is received, where the first interface signaling at least includes a number N of uplink data transmission channel addresses which are pre-allocated, where N is an integer greater than or equal to 2; and a number N of first-class uplink data transmission channels are established with the N uplink data transmission channel addresses respectively, where the first-class uplink data transmission channels are used for carrying and transmitting a user service data packet related to a single protocol data unit (PDU) session or multiple PDU sessions at a first base station.

In a third aspect, the present disclosure further provides a data transmission channel address allocation apparatus. The allocation apparatus includes a first sending module. The first sending module is configured to send first interface signaling to a first base station. The first interface signaling at least includes a number N of uplink data transmission channel addresses which are pre-allocated, where N is an integer greater than or equal to 2.

In a fourth aspect, the present disclosure further provides a data transmission channel association apparatus. The association apparatus includes a second receiving module and an uplink channel establishing module. The second receiving module is configured to receive first interface signaling sent by a core network, where the first interface signaling at least includes a number N of uplink data transmission channel addresses which are pre-allocated, where N is an integer greater than or equal to 2. The uplink channel establishing module is configured to establish a number N of first-class uplink data transmission channels with the N uplink data transmission channel addresses respectively, where the first-class uplink data transmission channels are used for carrying and transmitting a user service data packet related to a single protocol data unit (PDU) session or multiple PDU sessions at a first base station.

In a sixth aspect, the present disclosure further provides a storage medium. The storage medium stores a computer program. The computer program, when executed by a processor, implements steps of the data transmission channel association method described above.

DETAILED DESCRIPTION

The present disclosure provides a data transmission channel address allocation method, association method, apparatus, and a storage medium. In the related art, an uplink data transmission channel address port of a single UPF is likely to cause an increase in an end-to-end transmission delay of an uplink data packet, or an uplink data transmission channel needs to be re-established with other new addresses when a fault occurs, so that the service interruption is caused, the use effect of a user is affected. The present disclosure will be further described in detail below in conjunction with the accompanying drawings and embodiments. It should be understood that the embodiments described herein are merely used for explaining the present disclosure, and are not limiting of the present disclosure.

Figure 1:
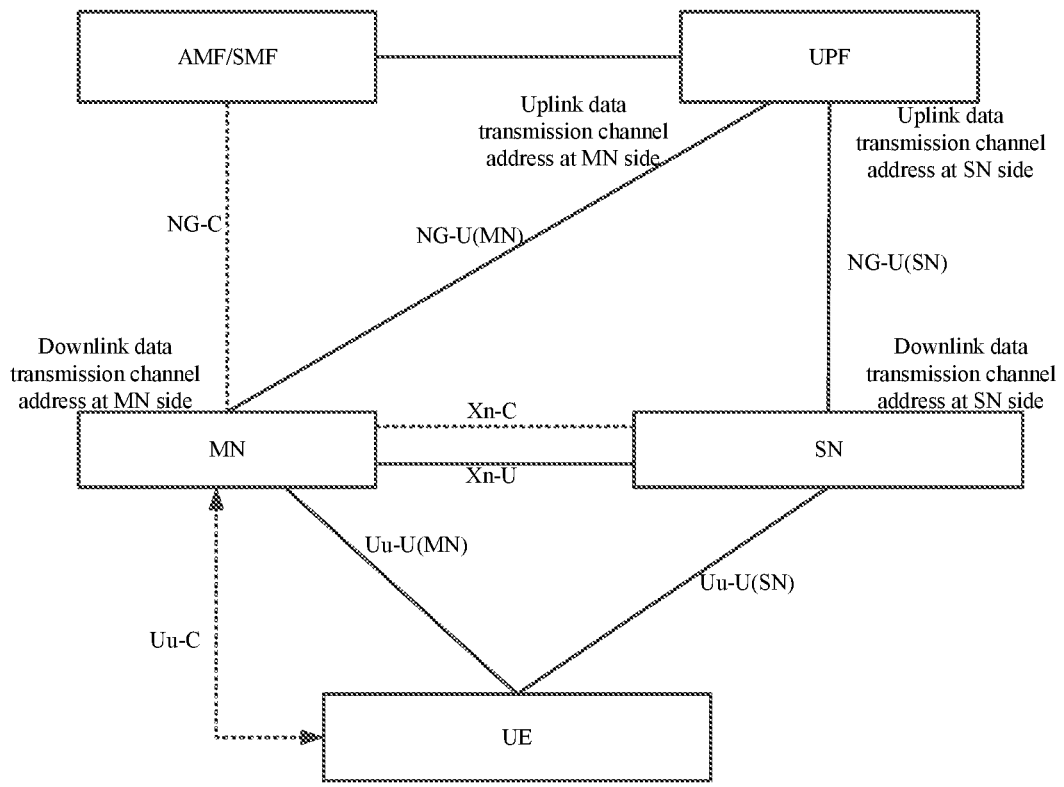
FIG. 1 is a schematic diagram of a network architecture of a dual connectivity operating mode in the related art.
Figure 2:
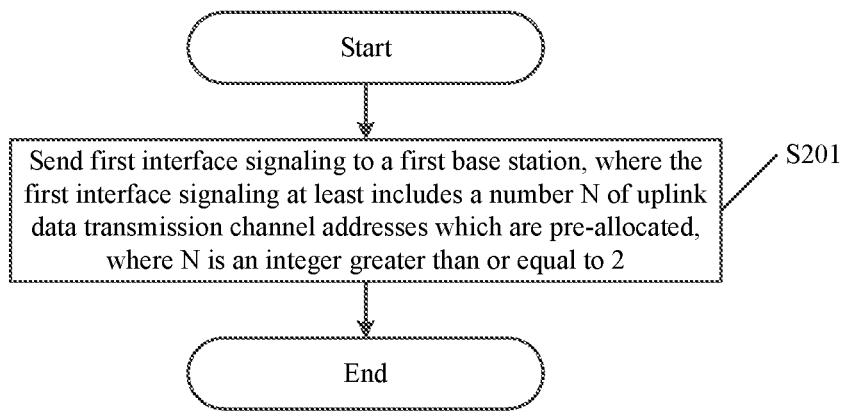
FIG. 2 is a flowchart of a data transmission channel address allocation method in a first embodiment of the present disclosure.

A first embodiment of the present disclosure provides a data transmission channel address allocation method. As shown in FIG. 2, the flowchart of the data transmission channel address allocation method includes step S201, in which first interface signaling is sent to a first base station. The first interface signaling at least includes a number N of uplink data transmission channel addresses which are pre-allocated, and N is an integer greater than or equal to 2.

In this embodiment, the uplink data transmission channel address (uplink address for short) is pre-allocated by a UPF in a 5GC core network, and first interface signaling generated by an AMF/SMF is sent to the first base station through a NG interface. It should be understood that, in a dual/multi connectivity mode, since a SN cannot be directly connected to the AMF/SMF, the first base station is a master node (MN). In order to ensure the flexibility and performance of data transmission between the UPF and the base station, the number of uplink data transmission channel addresses pre-allocated by the UPF is at least two. It should be understood that, in the related art, the UPF has been able to allocate multiple uplink data transmission channel addresses for different PDU Sessions, but the embodiment of the present disclosure emphasizes that the N uplink data transmission channel addresses may be jointly allocated for a certain PDU session. If the N uplink data transmission channel addresses exist for each PDU Session, totally N*X uplink data transmission channel addresses are provided for X different PDU Sessions.

In an embodiment, the AMF/SMF also receives first feedback signaling sent by the first base station through the NG interface, the first feedback signaling at least including a downlink data transmission channel address (downlink address for short) of the first base station; the UPF establishes a downlink data transmission channel with the first base station according to the downlink data transmission channel address of the first base station, so as to transmit downlink data. Since there is only one downlink data transmission channel address provided by the MN, only one downlink data transmission channel is provided. In a dual connectivity or multi connectivity mode, there may be multiple SNs in addition to the MN. Taking the dual connectivity mode as an example, when there is one second base station, the first feedback signaling sent by the first base station further includes a downlink data transmission channel address of the second base station in addition to the downlink data transmission channel address of the first base station. The UPF establishes the downlink data transmission channel with the first base station and the second base station respectively according to the first feedback signaling. Similarly, there may be a third base station, a fourth base station, etc. in the multi connectivity mode, and the first feedback signaling further includes a downlink data transmission channel address of the third base station and a downlink data transmission channel address of the fourth base station, and the UPF establishes downlink data transmission channel addresses respectively according to the number of the downlink data transmission channel addresses in the first feedback signaling, which will not be described in detail here.

In order to make the data transmission between a NG-RAN base station and the UPF more flexible, a UPF network element may set a used constraint condition for each uplink data transmission channel address, and send the above-mentioned constraint condition to the MN through the first interface signaling, and the MN sends an uplink data packet according to a content of the constraint condition. In an embodiment, the constraint condition may include, but is not limited to, following contents described below.

(1) The uplink address may be associatively used by which NG-RAN base stations, for example, in the dual/multi connectivity mode, a certain uplink address may only be associatively used by the MN, or may only be associatively used by the SN, or may be simultaneously associatively used by the MN/SN. The UPF network element may also directly indicate the constraint condition through a base station ID.

(2) The uplink address may be associatively used by which QoS Flow in the PDU Session, for example, the uplink address may only be associatively used by QoS Flows of a 5G QoS identifier (5QI) within a specific range (a continuous interval or discrete values in the range of 0 to 255), or may only be associatively used by QoS Flows of attribute parameters of a certain aspect of QoS within a specific value range, for example, a delay is lower than a certain threshold.

(3) A ratio of the total amount of data transmission corresponding to the uplink address, for example, the UPF allocates two different uplink addresses to a certain NG-RAN base station, and sets proportions of the two uplink addresses to the total amount of the data transmission to be 70% and 30% respectively, so as to indicates that the base station needs to transmit data to these two address ports in a ratio of 7:3 respectively.

(4) Data transmission time limitation corresponding to the uplink address, for example, the UPF allocates two different uplink addresses to a certain NG-RAN base station, and data transmission time of the two uplink addresses is set to be 8 o'clock to 22 o'clock every day, the two uplink addresses may be used for transmitting data, and only an uplink address A may be used for data transmission in the remaining time period.

In an embodiment, in a process of data transmission, if the UPF determines that a current constraint condition is not suitable for a current transmission situation, or that a current certain uplink address needs to be changed, then the AMF/SMF sends second interface signaling to the first base station. The second interface signaling at least includes one of: modification of one or M uplink data transmission channel addresses of the N uplink data transmission channel addresses, or modification of the constraint condition; where M is a natural number less than or equal to N. When the second interface signaling includes the modification of the uplink address, the first base station re-establishes an uplink data transmission channel between the first base station and the modified uplink address; and when the second interface signaling includes the modification of the constraint condition, the first base station transmits the uplink data packet according to the modified constraint condition.

In an embodiment, when the UPF determines that one or M uplink addresses in the currently allocated N uplink addresses are not needed, the UPF sends third interface signaling to the first base station. The third interface signaling at least includes deletion and recovery of the one or M uplink data transmission channel addresses of the N uplink data transmission channel addresses, and where M is a natural number less than or equal to N. When the first base station receives the third interface signaling, an uplink data channel between the first base station and the uplink address deleted in the third interface signaling is disconnected, and the UPF performs an address recovery. It should be understood that if a second base station, a third base station, etc. exist in a current network, the first base station also needs to send the above-mentioned second interface signaling and third interface signaling to the second base station, the third base station, etc., so as to instruct the second base station, the third base station, etc. to perform respective operations such as channel establishment, channel deletion, and constraint condition modification.

According to this embodiment, the NG-RAN base station is allocated with at least two uplink data transmission channel addresses at a UPF side, so that the limitation of associated binding of the uplink data transmission channel and the unique uplink data transmission channel address is overcome, the flexibility and performance of data transmission between the NG-RAN base station and the UPF are enhanced, the robustness of the data transmission channels and the load balance between the data transmission channels are enhanced; and the QoS performance of QoS Flows is ensured, and the use experience of users is improved.

Figure 3:
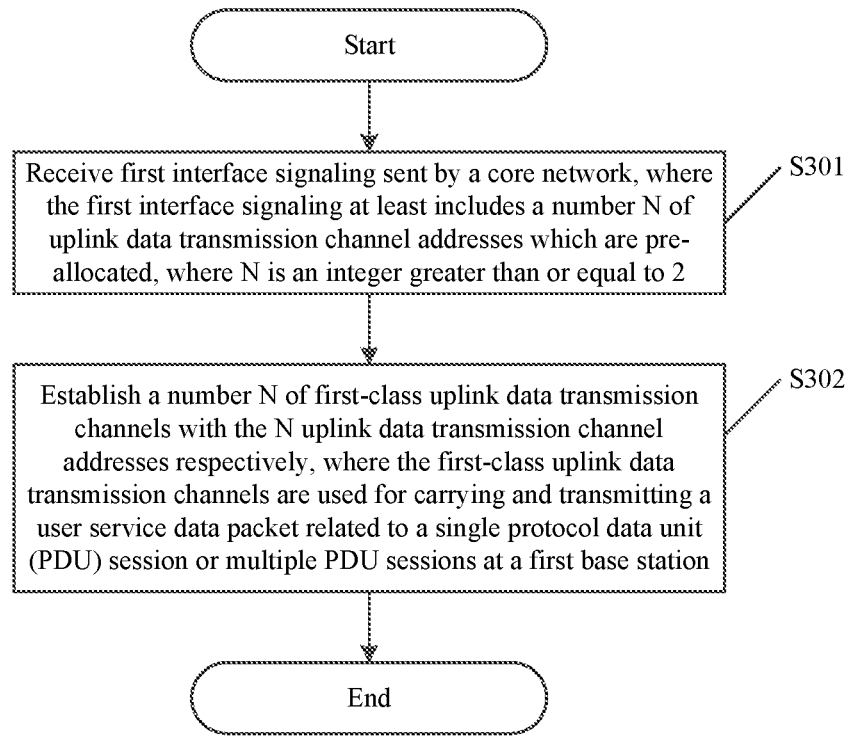
FIG. 3 is a flowchart of a data transmission channel address association method in a second embodiment of the present disclosure.

A second embodiment of the present disclosure provides a data transmission channel address association method. As shown in FIG. 3, the flowchart of the data transmission channel address association method includes steps S301 and S302.

In S301, first interface signaling sent by a core network is received, where the first interface signaling at least includes a number N of uplink data transmission channel addresses which are pre-allocated, where N is an integer greater than or equal to 2.

In S302, a number N of first-class uplink data transmission channels are established with the N uplink data transmission channel addresses respectively, where the first-class uplink data transmission channels are used for carrying and transmitting a user service data packet related to a single protocol data unit (PDU) session or multiple PDU sessions at a first base station.

In this embodiment, the uplink data transmission channel address is pre-allocated by a UPF in a 5GC core network, and the first interface signaling generated by an AMF/SMF is sent to the first base station through a NG interface. The first base station is a master node (MN). The N uplink data transmission channels established by the first base station according to the N uplink addresses provided in the first interface signaling are the first-class uplink data transmission channels, and are used for carrying and transmitting a user service data packet, namely a QoS Flow, related to a single PDU session or multiple PDU sessions at the first base station.

After the first base station receives the first interface signaling, the first base station sends first feedback signaling to the core network, where the first feedback signaling at least includes a downlink data transmission channel address of the first base station, and the UPF establishes a downlink data transmission channel with the first base station according to the above-mentioned downlink address.

In order to make the data transmission between the NG-RAN base station and the UPF more flexible, a UPF network element may set a use constraint condition for each uplink address, and send the above-mentioned constraint condition to the MN through the first interface signaling, and the MN sends an uplink data packet according to content of the constraint condition. In an embodiment, the constraint condition may include, but is not limited to, following contents described below.

(1) The uplink address may be associatively used by which NG-RAN base stations, for example, in a dual/multi connectivity mode, a certain uplink address may only be associatively used by the MN, or may only be associatively used by the SN, or may be simultaneously associatively used by the MN and SN. The UPF network element may also directly indicate the constraint condition through a base station ID.

(2) The uplink address may be associatively used by which QoS Flow in the PDU Session, for example, the uplink address may only be associatively used by QoS Flows of a 5QI within a specific range (a continuous interval or discrete values in the range of 0 to 255), or may only be associatively used by QoS Flows of attribute parameters of a certain aspect of QoS within a specific value range, for example, a delay is lower than a certain threshold.

(3) A ratio of the total amount of data transmission corresponding to the uplink address, for example, the UPF allocates two different uplink addresses to a certain NG-RAN base station, and sets corresponding proportions of the two uplink addresses to the total amount of the data transmission to be 70% and 30% respectively, so as to indicate that the base station needs to transmit data towards these two address ports in a ratio of 7:3 respectively.

(4) Data transmission time limitation corresponding to the uplink address, for example, the UPF allocates two different uplink addresses to a certain NG-RAN base station, and data transmission time of the two uplink addresses is set to be 8 o'clock to 22 o'clock every day, the two uplink addresses may be used for transmitting data, and only an uplink address A may be used for data transmission in the remaining time period.

In an embodiment, when the connectivity mode is the dual/multi connectivity mode, in addition to the first base station as the master node, there is at least one secondary node, such as the second base station, the third base station. Since in the dual/multi connectivity mode, processes such as the interaction between all secondary nodes and the master node, as well as the connection with the core network are completely the same, in this embodiment, only the dual connectivity mode is taken as an example, that is, the first base station is the MN, and there is one second base station as the SN. At this time, after receiving the first interface signaling, the first base station sends the first interface signaling to the second base station through an Xn-c interface, so as to instruct the second base station to establish a second-class uplink data transmission channel with the uplink address provided in the first interface signaling, and thus carry and transmit a user service data packet related to a single PDU session or multiple PDU sessions at the second base station. Moreover, the first base station obtains a downlink address of the second base station through the Xn-U, and sends the downlink address of the second base station together with the downlink address of the first base station to the core network together so as to facilitate the core network to establish downlink data transmission channels respectively. In a case where the first interface signaling includes the constraint condition, after the first base station sends the first interface signaling to the second base station, the second base station also sends an uplink data packet according to the constraint condition.

In a process of data transmission, if the UPF determines that a current constraint condition is not suitable for a current transmission condition, or that a current certain uplink address needs to be changed, the AMF/SMF sends second interface signaling to the first base station. The second interface signaling at least includes one of: modification of one or M uplink data transmission channel addresses of the N uplink data transmission channel addresses, or modification of the constraint condition; where M is a natural number less than or equal to N. If the second interface signaling includes the modification of the uplink address, the first base station establishes a new uplink data transmission channel with the modified one or M uplink data transmission channel addresses; and if the second interface signaling includes the modification of the constraint condition, the first base station sends the uplink data packet according to the modified constraint condition.

In an embodiment, when the UPF determines that one or M uplink addresses in the currently allocated N uplink addresses are not needed, the UPF sends third interface signaling to the first base station. The third interface signaling at least includes deletion and recovery of the one or M uplink data transmission channel addresses of the N uplink data transmission channel addresses, where M is a natural number less than or equal to N. When the first base station receives the third interface signaling, an uplink data channel between the first base station and the uplink address deleted in the third interface signaling is disconnected, and the UPF performs an address recovery. It should be understood that if a second base station, a third base station, etc. exist in a current network, the first base station also needs to send the above-mentioned second interface signaling and third interface signaling to the second base station, the third base station, etc., so as to instruct the second base station, the third base station, etc. to perform respective operations such as channel establishment, channel deletion, and constraint condition modification.

According to this embodiment, the NG-RAN base station is allocated with at least two uplink data transmission channel addresses at a UPF side, so that multiple uplink data transmission channels may be established at the base station side, the flexibility and performance of data transmission between the NG-RAN base station and the UPF are enhanced, the robustness of the data transmission channels and the load balance between the data transmission channels are enhanced; and the QoS performance of QoS Flows is ensured, and the use experience of users is improved.

A third embodiment of the present disclosure provides a data transmission channel address allocation apparatus. The data transmission channel address allocation apparatus includes a first sending module 401. The first sending module 401 is configured to send first interface signaling to a first base station, where the first interface signaling at least includes a number N of uplink data transmission channel addresses which are pre-allocated, where N is an integer greater than or equal to 2.

In this embodiment, the above-mentioned allocation apparatus is installed on a server device used as a core network, and may be divided into an AMF unit, an SMF unit and a UPF unit according to functions. The uplink data transmission channel address is pre-allocated by a UPF, and first interface signaling generated by an AMF/SMF is sent to the first base station through the first sending module. It should be understood that in a dual/multi connectivity mode, since the SN cannot be directly connected to the AMF/SMF, the first base station is the master node (MN). In order to ensure the flexibility and performance of data transmission between the UPF and the base station, at least two uplink data transmission channel addresses are pre-allocated by the UPF. It should be understood that, in the related art, the UPF has been able to allocate multiple uplink data transmission channel addresses for different PDU Sessions, but the embodiments of the present disclosure emphasize that the N uplink data transmission channel addresses may be jointly allocated for a certain PDU session. In an embodiment, if the N uplink data transmission channel addresses exist in each PDU Session, totally N*X uplink data transmission channel addresses are provided for X different PDU Sessions.

Figure 4:
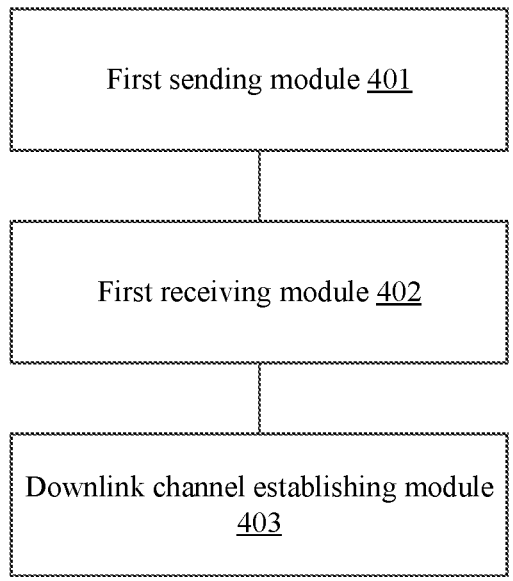
FIG. 4 is a structural diagram of a data transmission channel address allocation apparatus in a third embodiment of the present disclosure.

In an embodiment, as shown in FIG. 4, the allocation apparatus further includes a first receiving module 402. The first receiving module 402 is coupled to the first sending module 401, and configured to receive first feedback signaling sent by the first base station. The first feedback signaling at least includes a downlink data transmission channel address of the first base station. The UPF establishes a downlink data transmission channel with the first base station through a downlink channel establishing module 403 according to the downlink data transmission channel address of the first base station received by the first receiving module, so as to transmit downlink data. Since there is only one downlink data transmission channel address provided by the MN, so that only one downlink data transmission channel is provided. In a dual connectivity or multi connectivity mode, there may be multiple SNs in addition to the MN. Taking the dual connectivity mode as an example, when there is one second base station, the first feedback signaling sent by the first base station includes the downlink data transmission channel address of the second base station in addition to the downlink data transmission channel address of the first base station, and the UPF establishes the downlink data transmission channel with the first base station and the second base station respectively through the downlink channel establishing module according to the first feedback signaling. Similarly, a third base station and a fourth base station and the like may exist in the multi connectivity mode, the first feedback signaling further includes the downlink data transmission channel addresses of the third base station and the fourth base station, and the UPF establishes downlink data transmission channel addresses respectively according to the number of the downlink data transmission channel addresses in the first feedback signaling, which will not be described in detail here.

In order to make the data transmission between the NG-RAN base station and the UPF more flexible, a UPF network element may set a use constraint condition for each uplink data transmission channel address, and send the above-mentioned constraint condition to the MN through the first sending module, and the MN sends an uplink data packet according to contents of the constraint condition. In an embodiment, the constraint condition may include, but is not limited to, contents described below.

(1) The uplink address may be associatively used by which NG-RAN base stations, for example, in a dual/multi connectivity mode, a certain uplink address may only be associatively used by the MN, or may only be associatively used by the SN, or may be simultaneously associatively used by the MN and SN. The UPF network element may also directly indicate the constraint condition through a base station ID.

(2) The uplink address may be associatively used by which QoS Flow in the PDU Session, for example, the uplink address may only be associatively used by QoS Flows of a 5G QoS identifier (5QI) within a specific range (a continuous interval or discrete values in the range of 0 to 255), or may only be associatively used by QoS Flows of attribute parameters of a certain aspect of QoS within a specific value range, for example, a delay is lower than a certain threshold.

(3) A ratio of the total amount of data transmission corresponding to the uplink address, for example, the UPF allocates two different uplink addresses to a certain NG-RAN base station, and sets corresponding proportions of the two uplink addresses to the total amount of the data transmission to be 70% and 30% respectively, so as to indicate that the base station needs to transmit data towards these two address ports in a ratio of 7:3 respectively.

(4) Data transmission time limitation corresponding to the uplink address, for example, the UPF allocates two different uplink addresses to a certain NG-RAN base station, and data transmission time of the two uplink addresses is set to be 8 o'clock to 22 o'clock every day, the two uplink addresses may be used for transmitting data, and only an uplink address A may be used for data transmission in the remaining time period.

In an embodiment, in a process of data transmission, if the UPF determines that a current constraint condition is not suitable for a current transmission situation, or that a current certain uplink address needs to be changed, second interface signaling is sent to the first base station through the first sending module. The second interface signaling at least includes one of: modification of one or M uplink data transmission channel addresses of the N uplink data transmission channel addresses, or modification of the constraint condition, and where M is a natural number less than or equal to N. When the second interface signaling includes the modification of the uplink address, the first base station re-establishes an uplink data transmission channel between the first base station and the modified uplink address; and when the second interface signaling includes the modification of the constraint condition, the first base station transmits the uplink data packet according to the modified constraint condition.

In an embodiment, when the UPF determines that one or M uplink addresses in the currently allocated N uplink addresses are not needed, the UPF sends third interface signaling to the first base station through the first sending module. The third interface signaling at least includes deletion and recovery of the one or M uplink data transmission channel addresses of the N uplink data transmission channel addresses, where M is a natural number less than or equal to N. When the first base station receives the third interface signaling, an uplink data channel with uplink addresses deleted in the third interface signaling is disconnected, and the UPF performs an address recovery. It should be understood that if a second base station, a third base station, etc. exist in a current network, the first base station also needs to send the above-mentioned second interface signaling and third interface signaling to the second base station, the third base station, etc., to instruct the second base station, the third base station, etc. to perform respective operations such as channel establishment, channel deletion, and constraint condition modification.

According to this embodiment, the NG-RAN base station is allocated with at least two uplink data transmission channel addresses at a UPF side, so that the limitation of associated binding of the uplink data transmission channel and the unique uplink data transmission channel address is overcome, the flexibility and performance of data transmission between the NG-RAN base station and the UPF are enhanced, the robustness of the data transmission channels and the load balance between the data transmission channels are enhanced; and the QoS performance of QoS Flows is ensured, and the use experience of users is improved.

Figure 5:
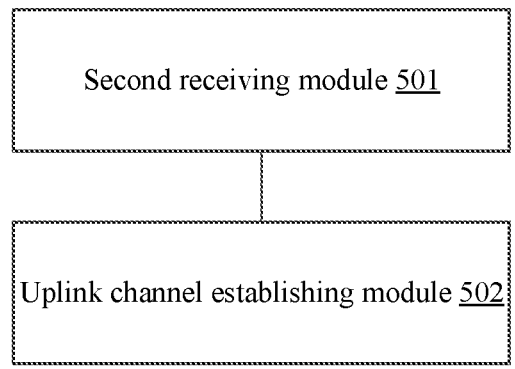
FIG. 5 is a structural diagram of a data transmission channel address association apparatus in a fourth embodiment of the present disclosure.

A fourth embodiment of the present disclosure provides a data transmission channel address association apparatus. FIG. 5 shows a schematic structural diagram of the data transmission channel address association apparatus, which includes a second receiving module 501 and an uplink channel establishing module 502. The second receiving module 501 is configured to receive first interface signaling sent by a core network, where the first interface signaling at least includes a number N of uplink data transmission channel addresses which are pre-allocated, where N is an integer greater than or equal to 2. The uplink channel establishing module 502 is coupled to the second receiving module 501, and is configured to establish a number N of first-class uplink data transmission channels with the N uplink data transmission channel addresses respectively, where the first-class uplink data transmission channels are used for carrying and transmitting a user service data packet related to a single protocol data unit (PDU) session or multiple PDU sessions at a first base station.

In the present embodiment, the association apparatus described above is installed on a server device used as a base station, and moreover, the association apparatus described above is mainly installed on a server device used as a master node. After the uplink data transmission channel address is pre-allocated by a UPF, the first interface signaling is sent to the second receiving module, the uplink channel establishing module establishes the N uplink data transmission channels as the first-class uplink data transmission channels according to the N uplink addresses provided in the first interface signaling, and is used for carrying and transmitting a user service data packet, namely, a QoS Flow, related to a single protocol data unit (PDU) session or multiple PDU sessions at the first base station.

After receiving the first interface signaling, a second sending module sends first feedback signaling to the core network, where the first feedback signaling at least includes a downlink data transmission channel address of the first base station, and the UPF establishes a downlink data transmission channel with the first base station according to the above-mentioned downlink address.

In order to make the data transmission between the NG-RAN base station and the UPF more flexible, a UPF network element may set a use constraint condition for each uplink address, and send the above-mentioned constraint condition to the MN through the first interface signaling, and the MN sends an uplink data packet according to content of the constraint condition. In an embodiment, the constraint condition may include, but is not limited to, following contents.

(1) The uplink address may be associatively used by which NG-RAN base stations, for example, in a dual/multi connectivity mode, a certain uplink address may only be associatively used by the MN, or may only be associatively used by the SN, or may be simultaneously associatively used by the MN and SN. The UPF network element may also directly indicate the constraint condition through a base station ID.

(2) The uplink address may be associatively used by which QoS Flow in the PDU Session, for example, the uplink address may only be associatively used by QoS Flows of a 5QI within a specific range (a continuous interval or discrete values in the range of 0 to 255), or may only be associatively used by QoS Flows of attribute parameters of a certain aspect of QoS within a specific value range, for example, a delay is lower than a certain threshold.

(3) A ratio of the total amount of data transmission corresponding to the uplink address, for example, the UPF allocates two different uplink addresses to a certain NG-RAN base station, and sets corresponding proportions of the two uplink addresses to the total amount of the data transmission to be 70% and 30% respectively, so as to indicate that the base station needs to transmit data towards these two address ports in a ratio of 7:3 respectively.

(4) Data transmission time limitation corresponding to the uplink address, for example, the UPF allocates two different uplink addresses to a certain NG-RAN base station, and data transmission time of the two uplink addresses is set to be 8 o'clock to 22 o'clock every day, the two uplink addresses may be used for transmitting data, and only an uplink address A may be used for data transmission in the remaining time period.

In an embodiment, when the connectivity mode is the dual/multi connectivity mode, in addition to the first base station as the master node, there is at least one secondary node, such as the second base station, the third base station. Since in the dual/multi connectivity mode, processes such as the interaction between all secondary nodes and the master node, as well as the connection with the core network are completely the same, in this embodiment, only the dual connectivity mode is taken as an example, that is, the first base station is the MN, and there is one second base station as the SN. At this time, after receiving the first interface signaling, the first base station sends the first interface signaling to the second base station through a third sending module, so as to instruct the second base station to establish a second-class uplink data transmission channel with the uplink address provided in the first interface signaling, and thus carry and transmit a user service data packet related to a single PDU session or multiple PDU sessions at the second base station. Moreover, the first base station obtains a downlink address of the second base station through the third receiving module, and sends the downlink address of the second base station together with the downlink address of the first base station to the core network so as to facilitate the core network to establish downlink data transmission channels respectively. In a case where the first interface signaling includes the constraint condition, after the first base station sends the first interface signaling to the second base station, the second base station also sends an uplink data packet according to the constraint condition.

In a process of data transmission, if the UPF determines that a current constraint condition is not suitable for a current transmission situation, or that a certain uplink address needs to be changed, the UPF sends second interface signaling to the first base station. The second interface signaling at least includes one of: modification of one or M uplink data transmission channel addresses of the N uplink data transmission channel addresses, or modification of the constraint condition; where M is a natural number less than or equal to N. The first base station receives the above-mentioned second interface signaling through the second receiving module. When the second interface signaling includes the modification of the uplink address, the uplink channel establishing module establishes a new uplink data transmission channel with the modified one or M uplink data transmission channel addresses; and when the second interface signaling includes the modification of the constraint condition, the first base station sends the uplink data packet according to the modified constraint condition.

In an embodiment, when the UPF determines that one or M uplink addresses in the currently allocated N uplink addresses are not needed, the UPF sends third interface signaling to the first base station. The third interface signaling at least includes deletion and recovery of the one or M uplink data transmission channel addresses of the N uplink data transmission channel addresses, where M is a natural number less than or equal to N. The first base station receives the above-mentioned third interface signaling through the second receiving module. When the first base station receives the third interface signaling, an uplink data channel with the uplink address deleted in the third interface signaling is disconnected by the uplink channel establishing module, and the UPF performs an address recovery. It should be understood that if a second base station, a third base station, etc. exist in a current network, the first base station also needs to send the above-mentioned second interface signaling and third interface signaling to the second base station, the third base station, etc., to instruct the second base station, the third base station, etc. to perform respective operations such as channel establishment, channel deletion, and constraint condition modification.

According to this embodiment, the NG-RAN base station is allocated with at least two uplink data transmission channel addresses at a UPF side, so that multiple uplink data transmission channels may be established at the base station side, the flexibility and performance of data transmission between the NG-RAN base station and the UPF are enhanced, the robustness of the data transmission channels and the load balance between the data transmission channels are enhanced; and the QoS performance of QoS Flows is ensured, and the use experience of users is improved.

A fifth embodiment of the present disclosure provides a storage medium. The storage medium stores a computer program that implements a data transmission channel address allocation method. The computer program, when executed by a processor, implements steps described below.

In S11, first interface signaling is sent to a first base station, where the first interface signaling at least includes a number N of uplink data transmission channel addresses which are pre-allocated, where N is an integer greater than or equal to 2.

In this embodiment, the storage medium may be installed in a network server as a core network. Since the data transmission channel address allocation method at the core network has been described in detail in the first embodiment, which will not be repeated in this embodiment.

A sixth embodiment of the present disclosure provides a storage medium. The storage medium stores a computer program that implements a data transmission channel address association method. The computer program, when executed by a processor, implements steps described below.

In S21, first interface signaling sent by a core network is received, where the first interface signaling at least includes a number N of uplink data transmission channel addresses which are pre-allocated, where N is an integer greater than or equal to 2;

In S22, a number N of first-class uplink data transmission channels are established with the N uplink data transmission channel addresses respectively, where the first-class uplink data transmission channels are used for carrying and transmitting a user service data packet related to a single protocol data unit (PDU) session or multiple PDU sessions at a first base station.

In this embodiment, the storage medium may be installed in a network server as a master node. Since the data transmission channel address association method at the master node side has been described in detail in the first embodiment, which will not be repeated in this embodiment.

In this embodiment, the above-mentioned storage medium may include, but is not limited to, various media that may store a program code such as a U disk, a read-only memory (ROM), a random access memory (RAM), a mobile hard disk, a magnetic disk, or an optical disk. In this embodiment, the processor performs the method steps recited in the embodiments described above according to the program code already stored in the storage medium. Examples in this embodiment may be referred to examples described in the foregoing embodiments and implementations, which are not described in detail in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatus, and the modules or steps may be implemented by program codes executable by the computing apparatus, so that the modules or steps may be stored in a storage apparatus and executed by the computing apparatus, and in some circumstances, the modules or steps may be implemented by executing the illustrated or described steps in a sequence different from that described herein, or by making the modules or steps into various integrated circuit modules respectively, or making multiple modules or steps thereof into a single integrated circuit module. In this way, the present disclosure is not limited to any specific combination of hardware and software.

According to the above-mentioned embodiments, the scheme is elaborated from respective operation execution main body sides, and the scheme of the embodiments of the present disclosure are set out in more detail in conjunction with the attached drawings and the multi-main-body interaction process below. It should be pointed out that a large number of technical details disclosed below are used for explaining the present disclosure, and are not intended to exclusively limit the present disclosure.

Figure 6:
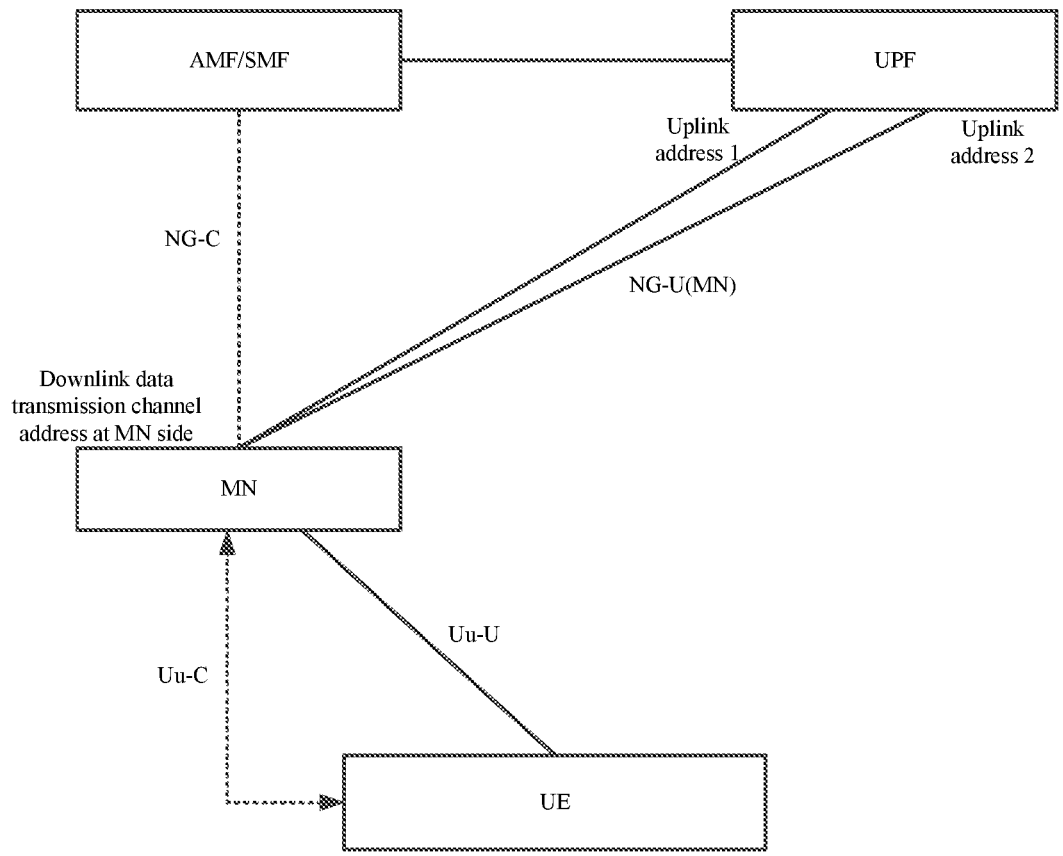
FIG. 6 is a schematic diagram of a network architecture of a single connectivity operating mode in a seventh embodiment of the present disclosure.

As shown in FIG. 6, in a seventh embodiment of the present disclosure, under a condition that a certain UE is in a single connectivity operating mode and only one PDU Session is to be established, a configuration method for two uplink data transmission channel addresses is as follows.

In S31, a UPF pre-allocates two uplink data transmission channel addresses 1 and 2 in advance, and the constraint condition is set as follows: the uplink addresses 1 and 2 may be associatively used by a base station to which the UE is connected.

In S32, an AMF/SMF sends NG interface application layer signaling (next generation application layer protocol (NGAP), such as a PDU session setup process, that is, the first interface signaling in the first embodiment of the present disclosure) through an NG interface, informs the MN of the uplink data transmission channel addresses 1 and 2, and then the MN establishes a simultaneous association with the uplink data transmission channel addresses 1 and 2 for transmission of the uplink data.

In S33, the MN informs the AMF/SMF of a unique downlink data transmission channel address allocated by the MN through the NGAP signaling (i.e., the first feedback signaling in the first embodiment of the present disclosure).

In S34, the UPF establishes an association with the unique downlink data transmission channel address for transmission of the downlink data.

In S35, after the uplink data transmission channel is established, the MN may freely select to send an uplink data packet contained in the PDU session to the uplink address 1 or 2.

Figure 7:
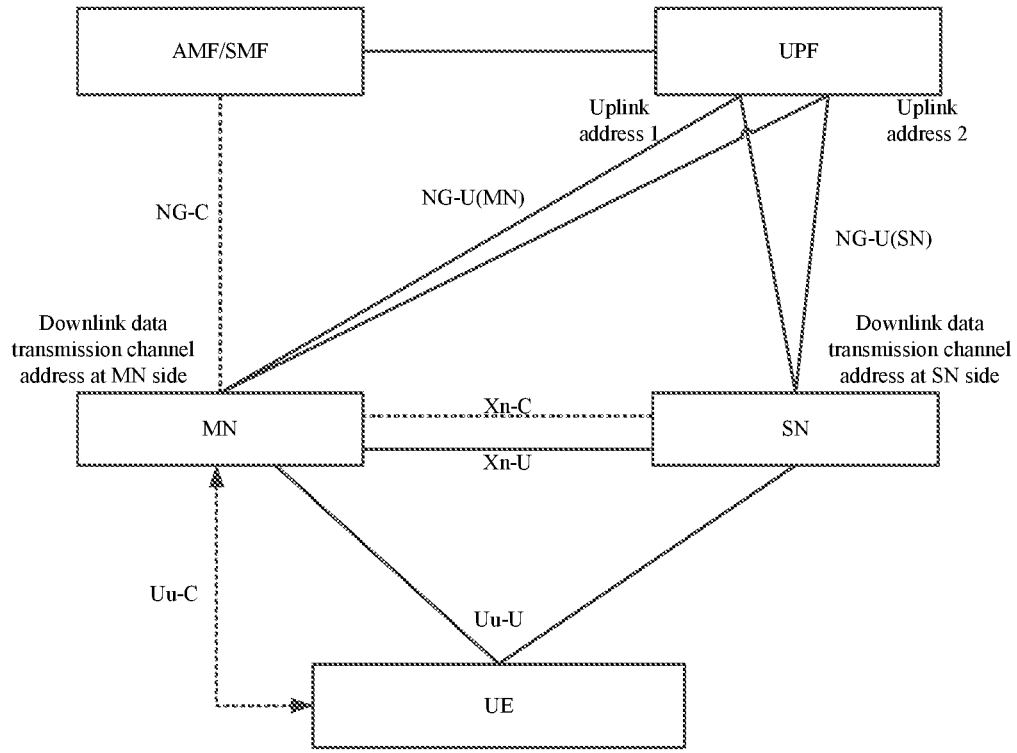
FIG. 7 is a schematic diagram of a network architecture of a dual connectivity operating mode in an eighth embodiment of the present disclosure.

As shown in FIG. 7, in an eighth embodiment of the present disclosure, under a condition that a certain UE is in a dual connectivity operating mode, there is only one PDU session to be established, and the PDU Session is ultimately split at a UPF (i.e., part of QoS Flows in a PDU Session are directed to a MN side for transmission, and other remaining QoS Flows are directed to a SN side for transmission), a configuration method for two uplink data transmission channel addresses is as follows.

In S41, a UPF pre-allocates two uplink data transmission channel addresses 1 and 2 in advance, and the constraint condition is set as follows: the uplink addresses 1 and 2 may be associatively used by a base station to which the UE is connected.

In S42, an AMF/SMF informs a MN of the uplink data transmission channel addresses 1 and 2 through NGAP signaling (such as the PDU session setup process, that is, the first interface signaling in the first embodiment of the present disclosure), and the MN determines a splitting mode of a PDU session to be established at the UPF, namely, determines which QoS Flows are directed to the MN or SN side for transmission, and interacts with the SN through XnAP signaling (i.e., the first interface signaling sent by the first base station to the second base station in the second embodiment of the present disclosure) to inform the SN of associating the above-mentioned uplink data transmission channel addresses 1 and 2, and the MN obtains a downlink data transmission channel address at the SN side allocated by the SN.

In S43, the MN and the SN each establish a simultaneous association with the uplink data transmission channel addresses 1 and 2 for transmission of respective uplink data.

In S44, the MN informs the AMF/SMF of downlink data transmission channel addresses at the MN side and the SN side as well as QoS Flows lists associated with the two downlink addresses respectively through the NGAP signaling.

In S45, the UPF establishes respective associations with the downlink data transmission channel addresses at the MN side and the SN side for transmission of the respective downlink data at the MN side and the SN side.

In S46, after MN and SN uplink data transmission channels are established, both the MN and the SN may freely select to send the uplink data packet to the uplink addresses 1 or 2.

Figure 8:
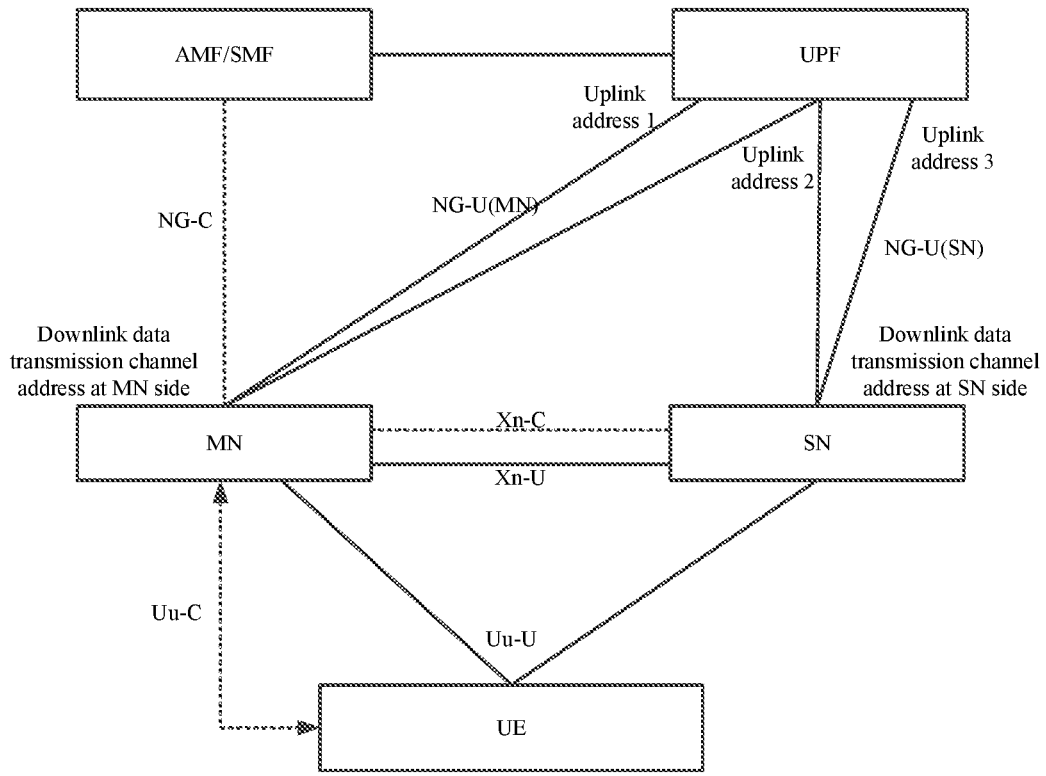
FIG. 8 is a schematic diagram of a network architecture of a dual connectivity operating mode in a ninth embodiment of the present disclosure.

As shown in FIG. 8, in a ninth embodiment of the present disclosure, under a condition that a certain UE is in a dual connectivity operating mode, there is only one PDU session to be established, and the PDU session is ultimately split at a UPF, a configuration method for three uplink data transmission channel addresses is as follows.

In S51, a UPF pre-allocates three uplink data transmission channel addresses 1, 2 and 3 in advance, and the constraint condition is set as follows: the uplink addresses 1 and 2 may be associatively used by a master node (MN) to which the UE is connected, and the uplink addresses 2 and 3 may be used by a secondary node SN to which the UE is connected.

In S52, an AMF/SMF informs the MN of the uplink data transmission channel addresses 1, 2 and 3 through NGAP signaling. The MN determines a splitting mode of a PDU Session to be established at the UPF, and interacts with the SN through XnAP signaling to inform the SN of associating the above-mentioned uplink data transmission channel addresses 2 and 3, and the MN obtains a downlink data transmission channel address at the SN side allocated by the SN.

In S53, the MN establishes an association with the uplink data transmission channel addresses 1 and 2, and the SN establishes an association with the uplink data transmission channel addresses 2 and 3 for transmission of respective uplink data.

In S54, the MN informs the AMF/SMF of downlink data transmission channel addresses at the MN side and the SN side as well as QoS Flows lists associated with the two downlink addresses respectively through the NGAP signaling.

In S55, the UPF establishes respective associations with the downlink data transmission channel addresses at the MN side and the SN side, for transmission of respective downlink data at the MN side and the SN side.

In S56, after MN and SN uplink data transmission channels are established, the MN may freely select to send an uplink data packet towards the uplink addresses 1 or 2; and the SN may freely select to send the uplink data packet towards the uplink address 2 or 3.

Figure 9A:
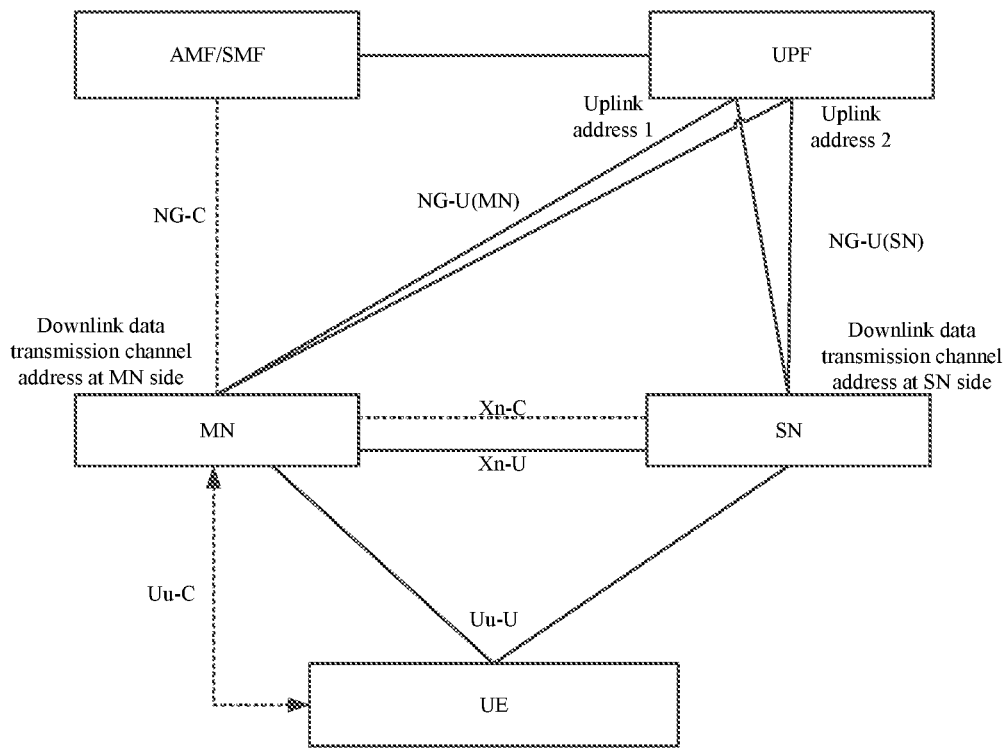
FIG. 9A and FIG. 9B are schematic diagrams of changes in a network architecture of a dual connectivity operating mode in a tenth embodiment of the present disclosure.
Figure 9B:
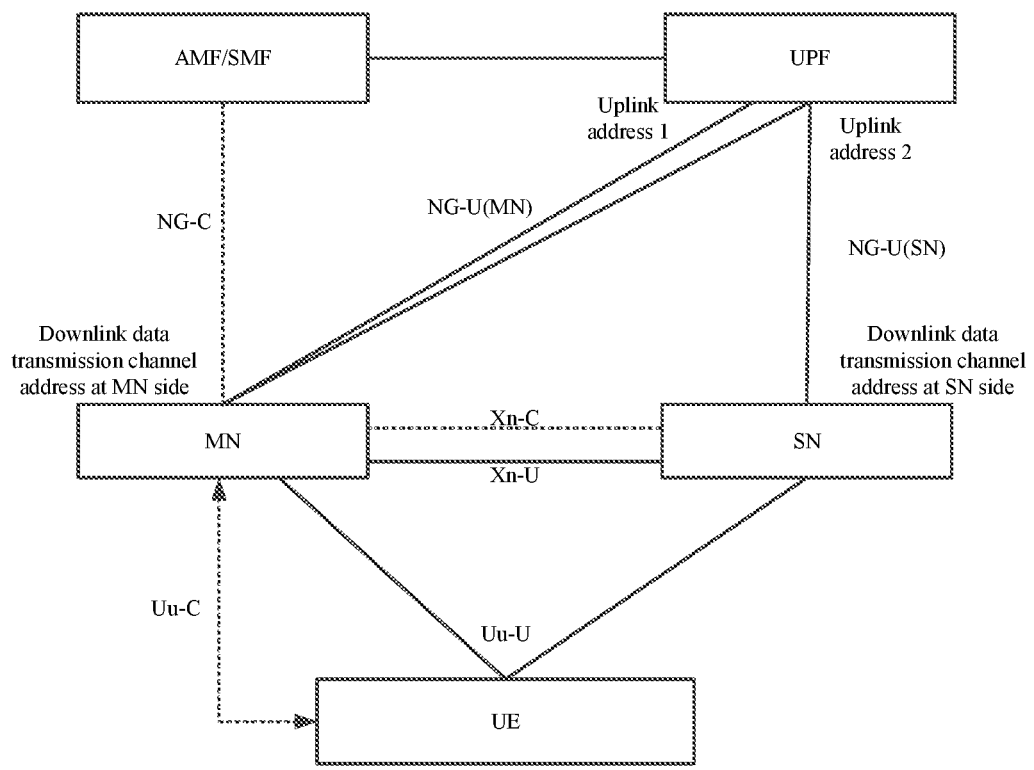

As shown in FIGS. 9A and 9B, in a tenth embodiment of the present disclosure, under a condition that a certain UE is in a dual connectivity operating mode, there is only one PDU session to be established, and the PDU session is ultimately split at a UPF, a configuration method for two uplink data transmission channel addresses is as follows.

In S61, a UPF pre-allocates two uplink data transmission channel addresses 1 and 2 in advance, and a constraint condition is set as follows: the uplink addresses 1 and 2 may be associatively used by the base station to which the UE is connected, but the uplink address 1 may only serve QoS Flows that guarantees a data transmission rate (GBR) class, and the uplink address 2 may only serve QoS Flows of a Non-GBR class.

In S62, an AMF/SMF informs the MN of the uplink data transmission channel addresses 1 and 2 through NGAP signaling, the MN determines a splitting mode of a PDU Session to be established at the UPF, and interacts with the SN through XnAP signaling to inform the SN of associating the uplink data transmission channel addresses 1 and 2, and the MN obtains a downlink data transmission channel address at the SN side allocated by the SN.

In S63, the MN and the SN each establish a simultaneous association with the uplink data transmission channel addresses 1 and 2 for transmission of respective uplink data.

In S64, the MN informs the AMF/SMF of downlink data transmission channel addresses at the MN side and the SN side as well as QoS Flows lists associated with the two downlink addresses respectively through the NGAP signaling.

In S65, the UPF establishes respective associations with the downlink data transmission channel addresses at the MN side and the SN side, for transmission of respective downlink data at the MN side and the SN side.

In S66, after MN and SN uplink data transmission channels are established, according to the constraint configuration, the MN/SN only sends an uplink data packet to the uplink address 1 by QoS Flow of a GBR class, and meanwhile, the MN/SN only sends the uplink data packet to the uplink address 2 by QoS Flow of a Non-GBR class.

In S67, after a period of time has elapsed, the UPF modifies the constraint condition of the uplink address 1 as follows: the uplink address 1 may only be associatively used by the master node MN, and the uplink address 2 may serve all types of QoS Flows.

In S68, the AMF/SMF informs the MN of a modified constraint condition of the uplink data transmission channel addresses 1 and 2 through NGAP signaling (such as a PDU Session Modify process), and then the MN informs the SN of the modified constraint condition of the uplink addresses 1 and 2 through the XnAP signaling.

In S69, the SN deletes the association with the uplink address 1, and an uplink address 1 port is no longer used. The SN redirects all types of QoS Flows to an uplink address 2 port, and the MN continues to send the QoS Flow of the GBR class towards the uplink address 1 so as to send the uplink data packet, and sends the QoS Flow of the Non-GBR class towards the uplink address 2 so as to send the uplink data packet.

It should be understood that FIG. 9A is a schematic diagram of a network connection before the constraint condition is modified, and FIG. 9B is a schematic diagram of a network connection after the constraint condition is modified. As may be seen by comparison, there is only one uplink channel exists between the SN and the UPF in FIG. 9B. The channel between the original SN and the uplink address 1 in FIG. 9A is deleted due to the modification of the constraint condition.

Figure 10A:
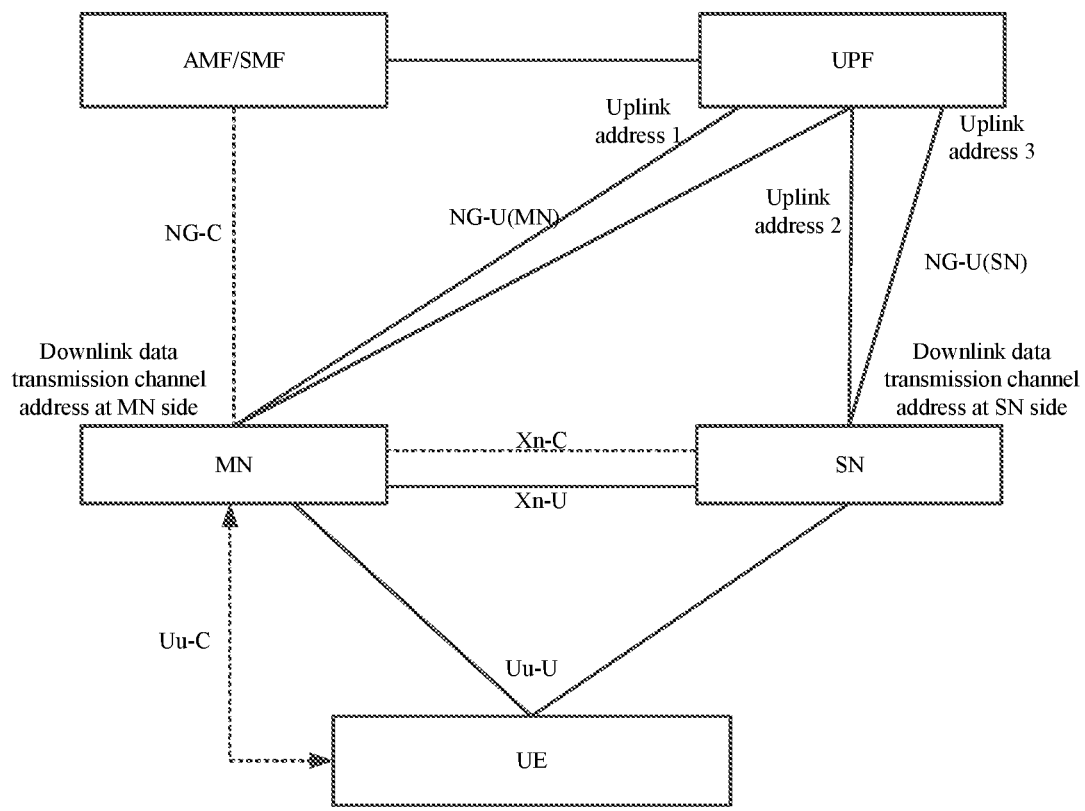
FIG. 10A and FIG. 10B are schematic diagrams of changes in a network architecture of a dual connectivity operating mode in an eleventh embodiment of the present disclosure.
Figure 10B:
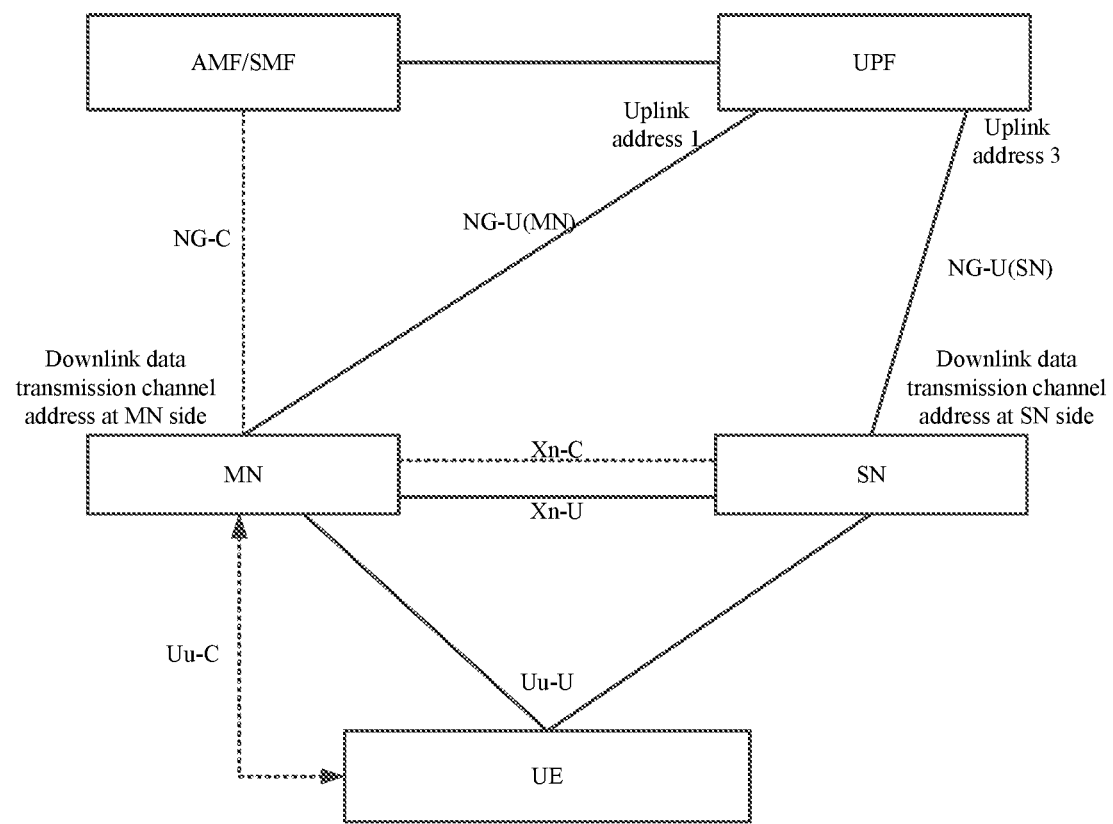

As shown in FIGS. 10A and 10B, in an eleventh embodiment of the present disclosure, under a condition that a certain UE is in a dual connectivity operating mode, there is only one PDU session to be established, and the PDU session is ultimately split at a UPF, a configuration method for three uplink data transmission channel addresses is as follows.

In S71, a UPF pre-allocates three uplink data transmission channel addresses 1, 2 and 3 in advance, and the constraint condition is set as follows: the uplink addresses 1 and 2 may be associatively used by a master node (MN) to which the UE is connected, and the uplink addresses 2 and 3 may be associatively used by a secondary node SN to which the UE is connected, and furthermore, for the MN, uplink addresses 1 and 2 ports respectively undertake an uplink data volume ratio of 6:4; for the SN, uplink addresses 2 and 3 ports respectively undertake an uplink data volume ratio of 2:8.

In S72, the AMF/SMF informs the MN of the uplink data transmission channel addresses 1, 2 and 3 and the constraint condition through NGAP signaling. The MN determines a splitting mode of a PDU session to be established at the UPF and interacts with the SN through XnAP signaling to inform the SN of associating the above-mentioned uplink data transmission channel addresses 2 and 3 as well as corresponding constraint condition, and the MN obtains a downlink data transmission channel address at the SN side allocated by the SN.

In S73, the MN establishes an association with the uplink data transmission channel addresses 1 and 2, and the SN establishes an association with the uplink data transmission channel addresses 2 and 3 for respective uplink data transmission.

In S74, the MN informs the AMF/SMF of downlink data transmission channel addresses at the MN side and the SN side as well as QoS Flows lists associated with the two downlink addresses through NGAP signaling.

In S75, the UPF establishes respective associations with the downlink data transmission channel addresses at the MN side and the SN side for transmission of the respective downlink data at the MN side and the SN side.

In S76, after MN and SN uplink data transmission channels are established, the MN sends uplink data packets towards the uplink addresses 1 and 2 respectively according to the data volume ratio of 6:4, the SN sends uplink data packets towards the uplink addresses 2 and 3 respectively according to a data volume ratio of 2:8.

In S77, after a period of time has elapsed, the UPF determines to delete the uplink address 2 due to the failure of the uplink address 2. The AMF/SMF informs the MN of deletion information of the uplink data transmission channel address 2 through NGAP signaling (such as the PDU Session Modify process), and then the MN informs the SN of the deletion information of the uplink data transmission channel address 2 through the XnAP signaling.

In S78, the MN/SN deletes the association with the uplink address 2, and an uplink address 2 port is no longer used. The MN sends all types of QoS Flows towards the uplink address 1 so as to send the uplink data packet, and the SN sends all types of QoS Flows towards the uplink address 3 so as to send the uplink data packet.

It should be understood that FIG. 10A is a schematic diagram of a network connection before the uplink address 2 is deleted, and FIG. 10B is a schematic diagram of a network connection after the uplink address 2 is deleted. As may be seen by comparison, only one uplink channel exists between the MN/SN and the UPF in FIG. 10B, and the channel between the original MN/SN and the uplink address 2 in FIG. 10A disappears due to deletion and recovery of the uplink address 2, and meanwhile, the proportion of the transmission data volume in the constraint condition is also invalid due to the deletion and recovery of the uplink address 2.

Although embodiments of the present disclosure have been disclosed for illustrative purposes, those skilled in the art will realize that various improvements, additions, and substitutions are also possible, and therefore, the scope of the present disclosure should not be limited to the embodiments described above.

What is claimed is:

1. A data transmission channel address allocation method, comprising:
   sending first interface signaling to a first base station, wherein the first interface signaling at least comprises a number N of uplink data transmission channel addresses which are pre-allocated for one single protocol data unit, PDU, session at the first base station, wherein N is an integer greater than or equal to 2,
   wherein the first interface signaling further comprises a constraint condition applicable to the pre-allocated N uplink data transmission channel addresses; and
   wherein after sending the first interface signaling to the first base station, the method further comprises:
   sending second interface signaling to the first base station, wherein the second interface signaling at least comprises: modification of one or M uplink data transmission channel addresses of the N uplink data transmission channel addresses, wherein M is a natural number less than or equal to N.

2. The allocation method of claim 1, wherein after sending the first interface signaling to the first base station, the method further comprises:
   receiving first feedback signaling sent by the first base station, wherein the first feedback signaling at least comprises a downlink data transmission channel address of the first base station; and
   establishing a downlink data transmission channel with the first base station according to the first feedback signaling, wherein the downlink data transmission channel is used for carrying and transmitting a user service data packet related to a PDU session or a plurality of PDU sessions.

3. The allocation method of claim 2, wherein after sending the first interface signaling to the first base station, the method further comprises:
   receiving the first feedback signaling sent by the first base station, wherein the first feedback signaling at least comprises a downlink data transmission channel address of the first base station and a downlink data transmission channel address of a second base station; and establishing downlink data transmission channels with the first base station and the second base station respectively according to the first feedback signaling.

4. The allocation method of claim 1, wherein after sending the first interface signaling to the first base station, the method further comprises:
sending third interface signaling to the first base station, wherein the third interface signaling at least comprises deletion and recovery of the one or M uplink data transmission channel addresses of the N uplink data transmission channel addresses, and M is a natural number less than or equal to N.

5. A non-transitory computer-readable storage medium, storing a computer program, wherein the computer program, when executed by a processor, implements steps of the data transmission channel address allocation method of claim 1.

6. A data transmission channel address allocation apparatus, comprising:
a processor; and
a memory for storing instructions executable by the processor,
wherein when executing the instructions, the processor is configured to:
send first interface signaling to a first base station, wherein the first interface signaling at least comprises a number N of uplink data transmission channel addresses which are pre-allocated for one single protocol data unit, PDU, session at the first base station, wherein N is an integer greater than or equal to 2,
wherein the first interface signaling further comprises a constraint condition applicable to the pre-allocated N uplink data transmission channel addresses; and
wherein the processor is further configured to send second interface signaling to the first base station, wherein the second interface signaling at least comprises: modification of one or M of uplink data transmission channel addresses of the N uplink data transmission channel addresses, wherein M is a natural number less than or equal to N.

7. The allocation apparatus of claim 6, wherein the processor is further configured to:
receive first feedback signaling sent by the first base station, wherein the first feedback signaling at least comprises a downlink data transmission channel address of the first base station; and
establish a downlink data transmission channel with the first base station according to the first feedback signaling, wherein the downlink data transmission channel is used for carrying and transmitting a user service data packet related to a PDU session or a plurality of PDU sessions.

8. The allocation apparatus of claim 7, wherein the processor is further configured to:
receive the first feedback signaling sent by the first base station, wherein the first feedback signaling at least comprises a downlink data transmission channel address of the first base station and a downlink data transmission channel address of a second base station; and
establish downlink data transmission channels with the first base station and the second base station respectively according to the first feedback signaling.

9. The allocation apparatus of claim 6, wherein the processor is further configured to send third interface signaling to the first base station, wherein the third interface signaling at least comprises deletion and recovery of the one or M uplink data transmission channel addresses of the N uplink data transmission channel addresses, wherein M is a natural number less than or equal to N.

* * * * *